United States Patent
Monereau et al.

(10) Patent No.: US 10,391,440 B2
(45) Date of Patent: Aug. 27, 2019

(54) METHOD FOR PRODUCING OXYGEN BY VPSA

(71) Applicant: L'Air Liquide, Société Anonyme pour l'Etude et l'Exploitation des Procédés Georges Claude, Paris (FR)

(72) Inventors: Christian Monereau, Montpellier (FR); Maxime Perez, Bussiares (FR); Guillaume Rodrigues, Les Plessis Trevise (FR); Louis Toulemonde, Douai (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 147 days.

(21) Appl. No.: 15/560,351

(22) PCT Filed: Mar. 24, 2016

(86) PCT No.: PCT/FR2016/050651
§ 371 (c)(1),
(2) Date: Sep. 21, 2017

(87) PCT Pub. No.: WO2016/151253
PCT Pub. Date: Sep. 29, 2016

(65) Prior Publication Data
US 2018/0071673 A1 Mar. 15, 2018

(30) Foreign Application Priority Data
Mar. 26, 2015 (FR) .................................. 15 52551

(51) Int. Cl.
*B01D 53/047* (2006.01)
*B01D 53/053* (2006.01)

(52) U.S. Cl.
CPC ....... *B01D 53/0476* (2013.01); *B01D 53/053* (2013.01); *B01D 2253/108* (2013.01); *B01D 2256/12* (2013.01); *B01D 2257/102* (2013.01); *B01D 2259/4003* (2013.01); *B01D 2259/404* (2013.01); *B01D 2259/40015* (2013.01); *B01D 2259/40016* (2013.01); *B01D 2259/40052* (2013.01)

(58) Field of Classification Search
CPC ................ B01D 53/047; B01D 53/053; B01D 53/0476; B01D 2253/108; B01D 2256/12; B01D 2257/102; B01D 2259/40015; B01D 2259/40016; B01D 2259/4003; B01D 2259/40052; B01D 2259/404; C01B 13/0259

USPC .............................. 95/96–98, 100–103, 130
See application file for complete search history.

(56) References Cited

U.S. PATENT DOCUMENTS

| | | | |
|---|---|---|---|
| 4,969,935 A | 11/1990 | Hay | |
| 5,078,757 A | 1/1992 | Rottner et al. | |
| 5,223,004 A | 6/1993 | Eteve et al. | |
| 6,171,371 B1 * | 1/2001 | Derive | B01D 53/0473 95/100 |
| 6,287,366 B1 * | 9/2001 | Derive | B01D 53/047 95/100 |
| 2007/0095208 A1 * | 5/2007 | Baksh | B01D 53/047 95/96 |
| 2008/0000353 A1 * | 1/2008 | Rarig | B01D 53/0446 95/100 |
| 2008/0006151 A1 * | 1/2008 | Baksh | B01D 53/0476 95/96 |
| 2016/0271554 A1 * | 9/2016 | Ritter | B01D 53/047 |

FOREIGN PATENT DOCUMENTS

| | | |
|---|---|---|
| EP | 0 350 373 | 1/1990 |
| EP | 0 758 625 | 2/1997 |
| EP | 0 948 989 | 10/1999 |
| FR | 2 647 431 | 11/1990 |

OTHER PUBLICATIONS

International Search Report for PCT/FR2016/050651, dated Jun. 28, 2016.
Written Opinion for corresponding PCT/FR2016/050651, dated Jun. 28, 2016.
Written Opinion for related PCT/FR2016/050677, dated Jun. 28, 2016.

* cited by examiner

Primary Examiner — Frank M Lawrence, Jr.
(74) Attorney, Agent, or Firm — Elwood L. Haynes

(57) ABSTRACT

A method for producing oxygen by adsorbing a stream of atmospheric air, using a VPSA, including at least one adsorber, each adsorber undergoing a single pressure cycle including the following steps: a) producing a first stream of gas having an oxygen content T1 while loading the adsorber of the stream of atmospheric air upstream; b) producing a second stream of gas including an oxygen content T2<T1: c) producing a third stream of gas including an oxygen content T3<T2<T1 while simultaneously extracting a nitrogen-enriched residual stream; d) eluting the adsorber, from which the three streams of gas produced in steps a), b), and c) are taken with the second stream of gas produced in step b); e) repressurizing the adsorber consecutively with at least two streams, first and second repressurizing streams, with increasing oxygen content.

13 Claims, No Drawings

METHOD FOR PRODUCING OXYGEN BY VPSA

CROSS REFERENCE TO RELATED APPLICATIONS

This application is a 371 of International PCT Application PCT/FR2016/050651, filed Mar. 24, 2016, which claims priority to French Patent Application No. 1552551, filed Mar. 26, 23015, the entire contents of which are incorporated herein by reference.

BACKGROUND

The present invention relates to a process for the production of oxygen by adsorption of a stream of atmospheric air employing a unit of VPSA type.

The production of oxygen from atmospheric air by units of PSA type has undergone a significant expansion in recent decades. The improvements have related to the adsorbents, the technology and the process itself.

As regards the adsorbents, the most efficient units now use, within one and the same adsorber, a first layer intended to halt the humidity of the air and at least partially carbon dioxide. It will generally concern activated alumina or doped activated alumina which favors the adsorption of $CO_2$. In the event of particularly polluted air, a portion at least of the activated alumina can be replaced with more resistant silica gel.

Halting of the nitrogen is preferably carried out on a zeolite of the LiLSX type with optionally a prelayer of zeolite of X type for halting the residual $CO_2$ and beginning to adsorb nitrogen. Several types of LiLSX, more or less exchanged with lithium, for example, and optimized as a function of the nitrogen partial pressure within the bed, can be used in successive layers. Preferably, in the zone saturated with nitrogen at the end of the production phase, an adsorbent with a high adsorption capacity will be favored, whereas, in the mass transfer zone, an adsorbent with a high Henry's constant will be favored, while taking into account the thermal effects corresponding to these choices.

The diameters (or equivalent diameters in the case of adsorbent in the rod form) are generally between 0.5 and 2 mm. The dimension selected is a function of the duration of the cycle involved and is a compromise between kinetics and pressure drops.

The process proposed here is based a priori on the use of the abovementioned adsorbents but is not limited to their use. In particular, in the case of units employing short cycle times, for example less than 15 seconds, or a large number of adsorbers, for example 6 or more, it may be necessary to employ structured adsorbents (parallel-passage contactors, monolithic contactors, and the like) in order to avoid risks of attrition or of fluidization and pressure drops which are excessively high.

There have been a great many technological advances. They have concerned the valves, which are now faster, more reliable, more leaktight with regard to the atmosphere, and the like, devices, air compressors and vacuum pumps specially adapted by the manufacturers to the operating parameters of oxygen production units, drive by variable speed motor, more precise, more efficient and faster instrumentation and control system. Various types of adsorbers are used according to the flow rates involved or the local economic conditions: cylindrical adsorber having a vertical axis sometimes used in parallel until an assembly which can range, for example, up to 8 similar units for higher flow rates (reference is then made to group or cluster) is formed, cylindrical adsorber having a horizontal axis, radial adsorber. Several systems for holding the adsorbent in place and preventing attrition or fluidization have been employed (excess weight with ceramic or steel beads, membrane, balloon, spring, and the like). It is also possible to place in this field the management of the thermal effects with control of the thermal capacity of the adsorbent beds by addition of inert materials, such as phase change materials (PCMs). These types of developments, given non-exhaustively, can be applied in the context of the invention without it being able to be regarded as an improvement on what is provided here.

The last main field of improvement is the process itself. The term "process" is understood here to mean both the linking together of the stages which an adsorber will follow during its operation, and the characteristics of each of these stages: duration, amount of gas transferred, pressure, temperature, and the like.

Generally, the term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, to which it is also commonplace to give more specific names, depending on the pressure levels employed or the time necessary for an adsorber to return to its starting point (cycle time):

VSA processes, in which the adsorption is carried out substantially at atmospheric pressure, preferably between 0.95 and 1.25 bar abs, and the desorption pressure is less than atmospheric pressure, typically from 50 to 400 mbar abs;

MPSA or VPSA processes, in which the adsorption is carried out at a high pressure greater than atmospheric pressure, typically between 1.5 and 6 bar abs, and the desorption is carried out at a low pressure lower than atmospheric pressure, generally between 200 and 600 mbar abs;

PSA processes properly speaking, in which the high pressure is substantially greater than atmospheric pressure, typically between 3 and 50 bar abs, and the low pressure is substantially equal to or greater than atmospheric pressure, generally between 1 and 9 bar abs;

RPSA (Rapid PSA) processes, for which the duration of the pressure cycle is typically less than a minute;

URPSA (Ultra Rapid PSA) processes, for which the duration of the pressure cycle is of the order of a maximum of a few seconds.

It should be noted that these various designations are not standardized and that the limits are subject to variation according to the authors.

With the preceding definitions, the invention relates both to VSA processes and to VPSA processes. Currently, due to the cycle times used, it also concerns the RPSA process and possibly, in the future, the URPSA process. In order to simplify the text, we will confine ourselves from now on to the term VPSA in order to encompass the field of application of the invention as has just been defined.

Whatever the type of PSA, an adsorber will begin a period of adsorption until it is charged in the constituent or constituents to be halted at the high pressure and will then be regenerated by depressurization and extraction of the adsorbed compounds, before being restored, in practice repressurized, in order to again begin a new adsorption period. The adsorber has then carried out a "pressure cycle"

and the very principle of the PSA process is to link together these cycles one after the other; thus a cyclical process is concerned. The time which an adsorbent takes to return to its initial state is known as cycle time. In principle, each adsorber follows the same cycle with an offset in time, which is known as phase time or more simply phase. The following relationship thus exists:

Phase time=cycle time/number of adsorbents, and it is seen that the number of phases is equal to the number of adsorbers.

There exist units comprising only a single adsorber, whereas units, such as, for example, PSA $H_2$ units, frequently comprise from 10 to 16 adsorbers.

A cycle generally comprises periods of:
Production or Adsorption, during which the feed gas is introduced via one of the ends of the adsorber, the most adsorbable compounds are adsorbed preferentially and the gas enriched in the least adsorbable compounds (product gas) is extracted via the second end. The adsorption can be carried out at an increasing pressure, at a substantially constant pressure, indeed even at a slightly decreasing pressure;
Depressurization, during which the adsorber, which is no longer fed with feed gas, is discharged via at least one of its ends of a portion of the compounds present in the adsorbent and the free spaces. Taking as reference the direction of circulation of the fluid in the adsorption period, it is possible to define cocurrentwise, countercurrentwise or simultaneously co- and countercurrentwise depressurizations;
Elution or Purge, during which a gas enriched in the least adsorbable constituents (purge gas) circulates through the adsorbent bed in order to help in the desorption of the most adsorbable compounds. The Purge is generally carried out countercurrentwise;
Repressurization, during which the adsorber is at least partially repressurized before again starting an Adsorption period. The repressurization can be carried out countercurrentwise and/or cocurrentwise, with various streams (feed, production, streams internal to the unit);
Dead time, during which the adsorber remains in the same state. These dead times can form an integral part of the cycle, making possible the synchronization of stages between adsorbers, or form part of a stage which has finished before the time assigned. The valves can be closed or remain in this state according to the characteristics of the cycle.

Depressurization and Repressurization can be carried out in different ways, in particular when the PSA unit comprises a plurality of adsorbers (or of vessels). This thus leads to individual stages being defined in order to more exactly describe the gas transfers which occur between adsorbers (or vessels) and with the external environment (low-pressure waste gas, product gas, feed circuits).

The number of adsorbers is relatively independent of the linking together chosen for the stages, that is to say of the cycle. The use of several adsorbers makes it possible to directly use a stream resulting from a first adsorber in a second adsorber if the stages in question are simultaneous. It thus makes it possible to avoid the use of intermediate vessels, to better take advantage of the pressure gradients. This can also make it possible to optimize the operation of the devices, to render the production continuous, and the like.

As will be seen, there exist, at least to date, VPSA units comprising 1, 2, 3 or 4 adsorbers. It is also possible to use, in parallel, 2—or more—units of this type by optionally making joint use of some items of equipment (air filter, mufflers, production vessels, and the like, connected).

Contrary to many processes, in the case of the production of oxygen, the starting material, that is to say atmospheric air, is free and the energy consumption of the unit is one of the dominating items in the cost of production of the oxygen. For this reason, the slightest saving with regard to specific energy, at an unchanging capital expenditure, is advantageous because it directly and substantially impacts the production costs.

This is reflected in the facts by the existence of a large number of cycles which often differ only by a slightly different management of the incoming or exiting streams or by a slightly different adaptation of the arrangement of the stages to the number of adsorbers used.

The use of increasingly effective simulation programs now makes it possible to explore and to compare a very large number of variants and the gradual increase in the flow rates, by reducing the relative cost of the capital expenditure, makes possible, at a reasonable cost, a greater complexity in the management of the streams.

In the same way, the improvement in the kinetics of transfer of material or of heat related either to progress with regard to the adsorbents (increase in the intrinsic kinetics) or to the possibility of using smaller particles related to developments relating to adsorbers (radial adsorber, for example, monolithic adsorber, and the like) makes it possible to shorten the duration of the cycles and consequently the size of the adsorbers.

For all these reasons (free starting material, reduced influence of the capital expenditure), the energy consumption is increasingly assuming a dominating importance.

Starting from this, a problem which is posed is that of providing an improved process exhibiting an energetically high-performance cycle.

SUMMARY

A solution according to the invention is a process for the production of oxygen by adsorption of a stream of atmospheric air employing a unit of VPSA type comprising at least one adsorber, each adsorber being subjected to one and the same pressure cycle comprising the following stages:

a) production of a first gas stream comprising an oxygen content C1 while charging upstream the adsorber with the stream of atmospheric air, b) production of a second gas stream comprising an oxygen content C2<C1, c) production of a third gas stream comprising an oxygen content C3<C2<C1 with simultaneous extraction of a waste stream enriched in nitrogen, d) elution of the adsorber, from which have emerged the three gas streams produced in stages a), b) and c), by means exclusively of the second gas stream produced in stage b), e) repressurization of the adsorber which has been subjected to the elution of stage d) with successively at least two streams, a first and a second repressurization stream, having an increasing oxygen content, the first repressurization stream being the third gas stream produced in stage c) and the second repressurization stream being the second gas stream produced in stage b).

The pressure cycle employed in the context of the present invention can be used with 1, 2, 3 and 4 adsorbers and more generally N adsorbers with some adjustments, such as the addition of tanks for the temporary storage of certain streams.

As the case may be, the process according to the invention can exhibit one or more of the following characteristics:

- the production of the second gas stream in stage b) is carried out by cocurrentwise depressurization,
- the production of the second gas stream in stage b) is carried out in two steps, a first step during which the production is carried out by cocurrentwise depressurization and a second step during which the production is carried out by a cocurrentwise depressurization combined with a countercurrentwise depressurization,
- the countercurrentwise depressurization is carried out by means of a valve,
- the repressurization stage e) is carried out with successively 3 streams, a first, a second and a third repressurization stream, having an increasing oxygen content, the first repressurization stream being the third gas stream produced in stage c), the second repressurization stream being the second gas stream produced in stage b) and the third repressurization stream being the first gas stream produced in stage a),
- in the repressurization stage e), the repressurization with the first repressurization stream is carried out simultaneously with the introduction of air cocurrentwise on the feed side of the adsorber for at least a portion of this stage,
- in the repressurization stage e), the repressurization with the second repressurization stream is carried out simultaneously with the introduction of air cocurrentwise on the feed side of the adsorber for at least a portion of this stage,
- in the repressurization stage e), the repressurization with the third repressurization stream is carried out simultaneously with the introduction of air cocurrentwise on the feed side of the adsorber for at least a portion of this stage,
- the pressure at the end of stage a) is between 1.75 and 1.25 bara, preferably between 1.55 and 1.45 bara, the pressure at the end of stage b) is between 1.5 and 1.0 bara, preferably between 1.30 and 1.20, the pressure at the end of stage c) is between 1.0 and 0.7 bara, preferably between 0.90 and 0.80, and the low pressure of the pressure cycle is between 0.25 and 0.45 bara, preferably between 0.40 and 0.30,
- the duration of the pressure cycle is less than 60 seconds, preferably between 15 and 45 seconds,
- the unit of VPSA type comprises N adsorbers or N groups of adsorbers with each adsorber n or each group of adsorbers n following the pressure cycle with an offset of a phase time with respect to the pressure cycle of the adsorber n−1 with n≤N,
- N is between 1 and 4.

DESCRIPTION OF PREFERRED EMBODIMENTS

The solution proposed here is more simple than the solutions of the prior art as it results only in the production of three streams of decreasing purity and furthermore it differs with regard to the use of these streams in the cycle. The elution is carried out entirely with a portion of the stream produced in stage b), whereas the repressurization is carried out by successively using the streams produced of increasing purity.

The cycle proposed in the context of the present invention is thus characterized by the sequences i, i+1 and i+2, during which the unit produces 3 successive streams rich in oxygen and of decreasing purity. Stage i corresponds to stage a) and thus to the production proper with a mean purity C1 which generally corresponds to the specification requested by the client; let us take, by way of example, 93 vol % $O_2$. During this stage, the adsorber is fed with air via an air compression unit (C-air).

The stage referenced i+1 corresponds to stage b) and thus to the production of a second stream rich in oxygen but with a mean purity C2 lower than the preceding one; let us take, by way of example, 91 vol % $O_2$. This fraction can be produced with or without introduction of air at the other end of the adsorber. More specifically, the adsorber can be isolated on the air side and the oxygen fraction is produced by cocurrentwise decompression, or air can be introduced during only a fraction of this stage or throughout the duration of the stage, at nominal or reduced flow rate. It is also possible to simultaneously withdraw, during all or a part only of the stage, by countercurrentwise depressurization, a stream rich in nitrogen.

The stage referenced i+2 corresponds to stage c) and thus to the production of a third stream rich in oxygen with a mean purity C3 lower than the preceding one; let us take 89 vol % $O_2$. This stream is obtained by a cocurrentwise decompression simultaneous with a countercurrentwise decompression intended to simultaneously extract, from the adsorber, a stream rich in nitrogen. According to the pressure level, this countercurrentwise decompression can be carried out via a valve and/or via a vacuum pump. In practice, it will concern at least at the stage end a vacuum pumping and, for simplicity, the representation [VP] has been adopted to mean these different possibilities, VP being taken for "vacuum pumping" and the presence of square brackets meaning that the vacuum pumping stage is not obligatory.

The management in the cycle of these different oxygen fractions produced is characterized by the linking together of the following sequences:

Stage j corresponds to a stage of simple vacuum pumping in order to extract nitrogen. The production side of the adsorber is isolated.

Stage j+1 corresponds to a stage of elution with pumping. A gas rich in oxygen is introduced on the production side simultaneously with the pumping. The presence of oxygen facilities the desorption of the nitrogen.

Stages j+2, j+3 and j+4 are stages of repressurization of the adsorber.

The elution of stage j+1 is carried out solely with the gas resulting from stage b), corresponding to stage i+1 which was defined above.

The repressurization is carried out, for its part, by successive stages with streams of increasing oxygen purity: a first repressurization stream which is the third gas stream produced in stage c), a second repressurization stream which is the second gas stream produced in stage b) and optionally a third repressurization stream which is the first gas stream produced in stage a). According to the operating conditions, the contribution of the third repressurization may be weak and can be avoided, for simplicity. It is this which is meant here by the presence of square brackets: [C1].

There exist several ways of representing, in summarizing fashion, the cycles of a unit of PSA type.

Use will be made here of the tables method, in which each individual stage appears in one square. The cycle can be defined by describing all of the stages which an adsorber performs during a cycle. Preferably, the description of the different phases which the different adsorbers follow simultaneously are represented one under the other. If it is desired to be exhaustive, the operation of each adsorber is described one under the other. Each square defines a stage by an abbreviated title (Prod, Eq, Purge, and the like). This representation is very compact and very practical. However, since an incoming or exiting stream has several uses, this method loses clarity as it becomes difficult to simply define the corresponding stage. Nevertheless, this remains the method currently most widely used.

Use has been made here of an intermediate method in the form of a table where, for each stage, the incoming and exiting streams of the adsorber are defined. This method has already been used in a somewhat different form. Thus, for example:

| Prod |
|---|
| ⇑ |
| 1 |
| ⇑ |
| C-air | means that the adsorber is in stage 1 and that it receives as feed a stream resulting from a compressor (C-air), this stream being, in the context of the invention, atmospheric air. The stream corresponding to the production (Prod) exits at the opposite end of the adsorber.

| X |
|---|
| X |
| j |
| ⇓ |
| VP | means that stage j is a stage of simple placing under vacuum via a vacuum pump connected to the feed end while the production side is closed (X).

The two top or bottom squares are left empty, if what takes place respectively on the production side or feed side is not formally defined or is not to be defined at this moment for a satisfactory understanding of the cycle, that is to say, for example, that the fact that there is an extraction, an injection of gas or that the end is isolated is not characteristic of the stage in question and that all the cases, indeed even their combination, for example an injection followed by an extraction, are possible.

The family of cycles relating to the present invention can then be characterized by the following table, the columns left free meaning that, besides the 8 stages described, there may be additional stages, such as those corresponding to a change of vacuum pump, a final repressurization simply with air, and the like.

| C1 (Prod) | C2 | C3 | X | C2 | C3 | C2 | [C1] [Prod] |
|---|---|---|---|---|---|---|---|
| ⇑ | ⇑ | ⇑ | X | ⇓ | ⇓ | ⇓ | ⇓ |
| i | i+1 | i+2 | j | j+1 | j+2 | j+3 | j+4 |
| ⇑ |  | ⇓ | ⇓ | ⇓ |  |  |  |
| C-air |  | [VP] | VP | VP |  |  |  |

According to one embodiment, the production of a second gas stream rich in oxygen according to stage b) is carried out by simple cocurrentwise depressurization, corresponding to the following characteristic stages:

| C1 (Prod) | C2 | C3 | X | C2 | C3 | C2 | [C1] [Prod] |
|---|---|---|---|---|---|---|---|
| ⇑ | ⇑ | ⇑ | X | ⇓ | ⇓ | ⇓ | ⇓ |
| i | i+1 | i+2 | j | j+1 | j+2 | j+3 | j+4 |
| ⇑ | X | ⇓ | ⇓ | ⇓ |  |  |  |
| C-air | X | VP | VP | VP |  |  |  |

According to another embodiment, the production of the second gas stream rich in oxygen according to stage b) is carried out in two substages, first by simple cocurrentwise depressurization and then still by cocurrentwise depressurization but simultaneously with a countercurrentwise depressurization, preferably toward the atmosphere via a valve. The latter operation corresponds to the following characteristic substages k-a and k-b relating to the production of the stream of purity Pur2, which substages replace stage i+1 in the table above.

| C2 | |
|---|---|
| ⇑ | ⇑ |
| k-a | k-b |
| X | ⇓ |
| X | ATM |

According to another preferred embodiment, the initial repressurization of the adsorber with the third gas stream produced in stage c) is carried out simultaneously with the cocurrentwise introduction of air on the feed side during all or part of this stage. As the adsorber is under vacuum, this introduction of air can be carried out directly from the atmosphere via a valve. It can be an all or nothing valve or a valve whose opening changes throughout the stage. The opening may only be carried out the course of the stage with regard to a time delay or a pressure threshold. This opening is one of the parameters to be optimized. The most effective simulation software makes it possible to determine the tendencies to be observed. Onsite adjustments can make it possible to refine the opening characteristics. As it is not obligatory to pass through the vacuum pump and as it is possible for this injection of air to be reduced, indeed even zero, the representation [ATM] has been adopted to represent these operating possibilities, hence the representative stages:

| C1 (Prod) | C2 | C3 | X | C2 | C3 | C2 | [C1] [Prod] |
|---|---|---|---|---|---|---|---|
| ⇑ | ⇑ | ⇑ | X | ⇓ | ⇓ | ⇓ | ⇓ |
| i | i+1 | i+2 | j | j+1 | j+2 | j+3 | j+4 |
| ⇑ | X | ⇓ | ⇓ | ⇓ | ⇑ |  |  |
| C-air | X | [VP] | VP | VP | [ATM] |  |  |

According to another preferred embodiment, the repressurization of the adsorber with the second gas stream produced in stage b) is carried out simultaneously with the cocurrentwise introduction of air on the feed side during all or part of this stage and preferably throughout the entire stage. As the adsorber is under vacuum, the bulk of the repressurization with air can be carried out directly from the atmosphere via a valve. It can be an all or nothing valve or a valve whose opening changes throughout the stage. The opening may only be carried out the course of the stage with regard to a time delay or a pressure threshold. This opening is one of the parameters to be optimized. As said above, the air is preferably introduced throughout this stage and the corresponding representation is then as follows:

| C1 (Prod) | C2 | C3 | X | C2 | C3 | C2 | [C1] [Prod] |
|---|---|---|---|---|---|---|---|
| ⇑ | ⇑ | ⇑ | X | ⇓ | ⇓ | ⇓ | ⇓ |
| i | i + 1 | i + 2 | j | j + 1 | j + 2 | j + 3 | j + 4 |
| ⇑ | X | ⇓ | ⇓ | ⇓ | ⇑ | ⇑ | ⇑ |
| C-air | X | [VP] | VP | VP | [ATM] | ATM | |

According to a variant, the repressurization of the adsorber with the third gas stream produced in stage a) is carried out simultaneously with the cocurrentwise introduction of air on the feed side. In view of the pressure cycle, this optional repressurization takes place around atmospheric pressure or entirely above atmospheric pressure. It is then necessary to use a compression means (C-air) in order to introduce the atmospheric air into the adsorber.

| C1 (Prod) | C2 | C3 | X | C2 | C3 | C2 | C1 (Prod) |
|---|---|---|---|---|---|---|---|
| ⇑ | ⇑ | ⇑ | X | ⇓ | ⇓ | ⇓ | ⇓ |
| i | i + 1 | i + 2 | j | j + 1 | j + 2 | j + 3 | j + 4 |
| ⇑ | X | ⇓ | ⇓ | ⇓ | ⇑ | ⇑ | ⇑ |
| C-air | X | [VP] | VP | VP | [ATM] | ATM | C-air |

The production of oxygen (stage i) then immediately follows the repressurization by the stream rich in oxygen (stage j+4). In practice, it may justifiable to have there a reversal of the direction of circulation of the oxygen when the pressure in the adsorber exceeds the pressure of the oxygen circuit.

According to a preferred embodiment, the cycle additionally comprises a final repressurization of the adsorber with solely introduction of air on the feed side. This stage then precedes the stage of production of oxygen with the purity C1. The duration of this stage is determined by a time delay or by a pressure threshold. The air is introduced from the air compressor C-air as the adsorber is at a pressure greater than atmospheric pressure at least at the stage end. This stage takes place after the repressurization stage using the stream of purity C2 or after the optional stage of repressurization with gas of purity C1, resulting from the production.

The following two variants are then respectively obtained:

| C1 (Prod) | C2 | C3 | X | C2 | C3 | C2 | X |
|---|---|---|---|---|---|---|---|
| ⇑ | ⇑ | ⇑ | X | ⇓ | ⇓ | ⇓ | X |
| i | i + 1 | i + 2 | j | j + 1 | j + 2 | j + 3 | j + 4 |
| ⇑ | X | ⇓ | ⇓ | ⇓ | ⇑ | ⇑ | ⇑ |
| C-air | X | [VP] | VP | VP | [ATM] | ATM | C-air | and

| X | C1 (Prod) | C2 | C3 | X | C2 | C3 | C2 | [C1] [Prod] |
|---|---|---|---|---|---|---|---|---|
| X | ⇑ | ⇑ | ⇑ | X | ⇓ | ⇓ | ⇓ | ⇓ |
| i-1 | i | i + 1 | i + 2 | j | j + 1 | j + 2 | j + 3 | j + 4 |
| ⇑ | ⇑ | X | ⇓ | ⇓ | ⇓ | ⇑ | ⇑ | ⇑ |
| C-air | C-air | X | [VP] | VP | VP | [ATM] | ATM | C-air |

The choice of the high pressure of the cycle, while remaining within a relatively restricted range of pressures, can depend on the use which is made of the oxygen. If it is possible to use the production directly, that is to say without the addition of a compression device, it will be seen to that the oxygen is available at the correct pressure. Otherwise, it is by a VSA $O_2$ unit/$O_2$ compression means optimization that the best pressure will be determined, which will generally remain within the range extending from 1.25 to 1.75 bara. The choice of the low pressure, still within a limited pressure range, will depend both on the choice of the pumping device(s) and on the capital expenditure/energy economic optimization. A slightly lower pressure tends to reduce the volume of adsorbent to be brought into play but this is to the detriment of the energy consumption. The range envisaged in the context of the invention extends from 0.25 to 0.45 bara.

The intermediate pressures between the high and low pressures are determined by optimization, once the pressure cycle and the linking together of the stages have been selected.

Thus, according to an embodiment selected which comes within the context of the invention, the pressure at the end of stage a) is between 1.25 and 1.75 bara, the pressure at the end of stage b) is between 1.5 and 1.0 bara, the pressure at the end of stage c) is between 1.0 and 0.7 bara and the low pressure of the cycle is between 0.25 and 0.45 bara.

According to a preferred embodiment, the pressure at the end of stage a) is in the vicinity of 1.5 bara, the pressure at the end of stage b) is in the vicinity of 1.25 bara, the pressure at the end of stage c) is in the vicinity of 0.85 bara and the low pressure of the cycle is in the vicinity of 0.35 bara.

The term "in the vicinity" is understood to mean to plus or minus 50 mbar and preferably to plus or minus 25 mbar.

As was said above, it is possible to carry out this cycle with a priori any number of adsorbers but the most appropriate units will comprise 1, 2, 3 or 4 adsorbers.

According to one embodiment, the VPSA unit thus comprises 1 adsorber which follows the 8-stage cycle below:

| C1 (Prod) | C2 | C3 | X | C2 | C3 | C2 | [C1] [Prod] |
|---|---|---|---|---|---|---|---|
| ⇑ | ⇑ | ⇑ | X | ⇓ | ⇓ | ⇓ | ⇓ |
| 1 (i) | 2 (i + 1) | 3 (i + 2) | 4 (j) | 5 (j + 1) | 6 (j + 2) | 7 (j + 3) | 8 (j + 4) |
| ⇑ | X | ⇓ | ⇓ | ⇓ | ⇑ | ⇑ | ⇑ |
| C-air | X | [VP] | VP | VP | [ATM] | ATM | C-air |

Preferably, stage b), that is to say 2 in the above table, will comprise a first step 2-i during which production is carried out by cocurrentwise depressurization and a second step 2-ii during which production is carried out by a cocurrentwise depressurization combined with a countercurrentwise depressurization.

The corresponding cycle can be represented as follows:

| | | | | | | | |
|---|---|---|---|---|---|---|---|
| C1 (Prod) | C2 | | | C2 | C3 | C2 | |
| | | | | C3 | | | X |
| ⇑ | ⇑ | ⇑ | ⇑ | ⇓ | ⇓ | ⇓ | X |
| 1 (i) | 2-i (i + 1) | 2-ii (i + 1) | 3 (i + 2) | 4 (j) | 5 (j + 1) | 6 (j + 2) | 7 (j + 3) | 8 (j − 1) |
| ⇑ | X | ⇓ | ⇓ | ⇓ | ⇓ | ⇑ | ⇑ | ⇑ |
| C-air | X | ATM | VP | VP | VP | ATM | ATM | C-air |

This cycle, like the preceding one, comprises 3 holding tanks, corresponding to each of the purities.

This cycle differs very substantially from the other cycles proposed for a unit having just one adsorber. The document U.S. Pat. No. 6,132,496 in particular describes a unit comprising one adsorber, a single device acting as compressor and vacuum pump and comprising 3 tanks, like the cycles according to the present invention. Elution is carried out in both cases by the gas of second purity C2 but the repressurization on the oxygen side is carried out exclusively with the gas resulting from the production C1; there is neither gas of 3rd purity nor gradual repressurization with gases of increasing purity. All the other cycles of monoadsorber type operate a priori with one or two holding tanks only and thus employ different streams.

purity (C2). A portion of the streams which are produced will advantageously be used simultaneously, only the unused portion being stored.

The preferential cycle is characterized in that there is no introduction of air in the stage of production of the stream of oxygen of second purity; as explained above, the advantage of the introduction of oxygen during the final repressurization stage (stage 3) will partially depend on the type of adsorbers which are used. It may be unnecessary for a cylindrical adsorber having a vertical axis (or having a cluster of adsorbers of this type) exhibiting a low oxygen dead space and on the contrary, have a positive effect in the case of a radial adsorber comprising a high oxygen dead space, for example 30% of the volume of adsorbent.

With our conventions, the corresponding cycle for such an adsorber is represented as follows:

| | | | | C1 | | | | | | | |
|---|---|---|---|---|---|---|---|---|---|---|---|
| C3 | C2 | C1 | X | (Prod) | C2 | C3 | X | X | X | C2 | C2 |
| ⇓ | ⇓ | ⇓ | X | ⇑ | ⇑ | ⇗ | X | X | X | ⇓ | ⇓ |
| 1 (j + 2) | 2 (j + 3) | 3 (j + 4) | 4 (i − 1) | 5 (i) | 6 (i + 1) | 7 (i + 2) | 8 (j) | 9 (j) | 10 (j) | 11 (j + 1) | 12 (j + 1) |
| ⇑ | ⇑ | ⇑ | ⇑ | ⇑ | X | ⇓ | ⇓ | ⇓ | ⇓ | ⇓ | ⇓ |
| (Atm) | Atm | C-air | C-air | C-air | X | VP | VP | VP | VP | VP | VP |

According to another embodiment, the VPSA unit comprises 2 adsorbers.

In order to make the cycle simpler to follow, the start of the repressurization has been chosen as first stage. Nevertheless, it would be possible to begin with another stage without changing the principle thereof.

In the same spirit, each phase comprises the same number of stages, in this instance 5. This is not obligatory and, for example, stages 7 and 8, on the one hand, and 9 and 10, on the other hand, might be combined together into a single stage.

The reader is reminded that, during stage 1, the repressurization with the oxygen stream of purity Pur3 can be accompanied by a cocurrentwise repressurization with atmospheric air, which repressurization can begin in the course of the stage.

According to another embodiment, the VPSA unit comprises 3 adsorbers.

A cycle characteristic of the invention is represented below:

| | | | C1 | | | | | | |
|---|---|---|---|---|---|---|---|---|---|
| C3 | C2 | [C1] | (Prod) | C2 | C3 | X | X | C2 | C2 |
| ⇓ | ⇓ | ⇓ | ⇑ | ⇑ | ⇗ | X | X | ⇓ | ⇓ |
| 1 (i + 2) | 2 (i + 3) | 3 (j + 4) | 4 (i) | 5 (i + 1) | 6 (i + 2) | 7 (j) | 8 (j) | 9 (j + 1) | 10 (j + 1) |
| ⇑ | ⇑ | ⇑ | ⇑ | ⇑ | ⇓ | ⇓ | ⇓ | ⇓ | ⇓ |
| (Atm) | Atm | C-air | C-air | [C-air] | VP | VP | VP | VP | VP |

The unit comprises an air compressor which can be in continuous operation (stages 1 to 5) or noncontinuous operation.

The vacuum pump is in continuous operation (stages 6 to 10).

The cycle requires at least 2 holding tanks in order to manage the production stream (C1) and the stream of second

| C1 (Prod) | C2 | C3 | X | C2 | C3 | C2 | [C1] [Prod] |
|---|---|---|---|---|---|---|---|
| ⇑ | ⇑ | ⇑ | X | ⇓ | ⇓ | ⇓ | ⇓ |
| 1 | 2 (i) | 3 (i + 2) | 4 (i + 3) | 5 (j) | 6 (j + 1) | 7 (j + 2) | 8 (j + 3) | 9 (j + 4) |

-continued

| C1 (Prod) | C2 | C3 | X | C2 | C3 | C2 | [C1] [Prod] |
|---|---|---|---|---|---|---|---|
| ⇑ C-air | ⇑ C-air | X X | ⇓ VP | ⇓ VP | ⇓ VP | ⇑ [ATM] | ⇑ ATM ⇑ C-air |

Cycles corresponding to 1, 2 and 3 adsorbers have been described in detail but it is easy for a person skilled in the art, starting from the instructions given, to adapt this cycle to any number of adsorbers, for example for 6 adsorbers, starting from the final table by thus combining together the stages: 9+1/2/3+4/5/6/7+8, which constitutes only one of the possibilities.

For the cycles comprising 1 to 4 adsorbers, particulate adsorbents (beads, rods, crushed materials) are preferably used. And, for the cycles comprising more than 4 adsorbers, structured adsorbents are preferably used.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for the production of oxygen by adsorption of a stream of atmospheric air employing VPSA comprising at least one adsorber, each adsorber being subjected to the same pressure cycle comprising the following stages:
   a) production of a first gas stream comprising an oxygen content C1 while charging upstream the adsorber with the stream of atmospheric air,
   b) production of a second gas stream comprising an oxygen content C2<C1,
   c) production of a third gas stream comprising an oxygen content C3<C2<C1 with simultaneous extraction of a waste stream enriched in nitrogen,
   d) elution of the adsorber, from which have emerged the three gas streams produced in stages a), b) and c), with the second gas stream produced in stage b),
   e) repressurization of the adsorber which has been subjected to the elution of stage d) with successively at least two streams, a first and a second repressurization stream, having an increasing oxygen content, the first repressurization stream being the third gas stream produced in stage c) and the second repressurization stream being the second gas stream produced in stage b).

2. The process of claim 1, wherein the production of the second gas stream in stage b) is carried out by cocurrentwise depressurization.

3. The process of claim 1, wherein the production of the second gas stream in stage b) is carried out in two steps, a first step during which the production is carried out by cocurrentwise depressurization and a second step during which the production is carried out by a cocurrentwise depressurization combined with a countercurrentwise depressurization.

4. The process of claim 3, wherein the countercurrentwise depressurization is carried out by a valve.

5. The process of claim 1, wherein the repressurization stage e) is carried out with successively 3 streams, a first, a second and a third repressurization stream, having an increasing oxygen content, the first repressurization stream being the third gas stream produced in stage c), the second repressurization stream being the second gas stream produced in stage b) and the third repressurization stream being the first gas stream produced in stage a).

6. The process of claim 1, wherein, in the repressurization stage e), the repressurization with the first repressurization stream is carried out simultaneously with the introduction of air cocurrentwise on the feed side of the adsorber for at least a portion of this stage.

7. The process of claim 1, wherein, in the repressurization stage e), the repressurization with the second repressurization stream is carried out simultaneously with the introduction of air cocurrentwise on the feed side of the adsorber for at least a portion of this stage.

8. The process of claim 1, wherein, in the repressurization stage e), the repressurization with the third repressurization stream is carried out simultaneously with the introduction of air cocurrentwise on the feed side of the adsorber for at least a portion of this stage.

9. The process of claim 1, wherein, after the production stages a), b) and c) and before the elution stage d), the adsorber is subjected to a vacuum pumping stage.

10. The process of claim 1, wherein:
    the pressure at the end of stage a) is between 1.75 and 1.25 bar,
    the end of stage b) is between 1.5 and 1.0 bara,
    the pressure at the end of stage c) is between 1.0 and 0.7 bara, and
    the low pressure of the pressure cycle is between 0.25 and 0.45 bara.

11. The process of claim 1, wherein the duration of the pressure cycle is less than 60 seconds.

12. The process of claim 1, wherein the VPSA comprises N adsorbers or N groups of adsorbers with each adsorber n or each group of adsorbers n following the pressure cycle with an offset of a phase time with respect to the pressure cycle of the adsorber n−1 with n≤N.

13. The process of claim 12, wherein N is between 1 and 4.

* * * * *